United States Patent [19]

Barker

[11] 4,399,714
[45] Aug. 23, 1983

[54] METHOD AND APPARATUS FOR OVERCOMING CERTAIN DESTABILIZING TORQUES ON GYRO-STABILIZED PLATFORMS

[75] Inventor: A. Clifford Barker, Newport News, Va.

[73] Assignee: Navidyne Corporation, Newport News, Va.

[21] Appl. No.: 319,620

[22] Filed: Nov. 9, 1981

[51] Int. Cl.³ .......................................... G01C 19/26
[52] U.S. Cl. ..................................... 74/5.1; 74/5.22; 74/5.34
[58] Field of Search ......................... 74/5.1, 5.22, 5.34, 74/5.41, 5.8; 33/321; 343/765, 766, 882

[56] References Cited

U.S. PATENT DOCUMENTS

| | | |
|---|---|---|
| 940,329 | 11/1909 | Krell . |
| 1,050,153 | 1/1913 | Marmonier . |
| 1,083,370 | 1/1914 | Luyken ............................ 74/5.34 X |
| 1,186,856 | 6/1916 | Sperry ................................. 74/5.37 |
| 1,236,993 | 8/1917 | Sperry et al. . |
| 1,645,079 | 10/1927 | Titterington . |
| 1,999,897 | 4/1935 | Fieux ...................................... 33/46 |
| 2,199,294 | 4/1940 | Seligmann ............................ 33/204 |
| 2,606,448 | 8/1952 | Norden et al. ....................... 74/7.34 |
| 2,771,779 | 11/1956 | Schaffer et al. ...................... 74/5.34 |
| 2,811,042 | 10/1957 | Kenyon ................................ 74/5.22 |
| 2,970,382 | 2/1961 | Notomi ................................ 33/321 |
| 3,006,197 | 10/1961 | Kenyon et al. ....................... 74/5.22 |
| 3,492,735 | 2/1970 | Burdick et al. ....................... 33/226 |
| 4,020,491 | 4/1977 | Bieser et al. ......................... 343/765 |
| 4,118,707 | 10/1978 | Yoshida et al. ...................... 343/765 |
| 4,193,308 | 3/1980 | Stuhler et al. ....................... 74/5.22 |

OTHER PUBLICATIONS

Matthews, "Direct Mechanical Stabilization of Mobile Microwave Antennas", Paper AIAA 8th Communications Satellite Systems Conference, Apr. 1980.

Primary Examiner—Rodney H. Bonck
Attorney, Agent, or Firm—Shapiro and Shapiro

[57] ABSTRACT

Destabilization of a gyro-stabilized platform (such as employed for mounting an antenna on-board a ship) resulting from uncompensated yaw or rotation of the platform in azimuth from a fixed reference orientation is prevented by employing a pair of counter-rotating gyros for each stabilized axis and caging gyros having a spin direction opposite to the direction of rotation of the platform.

7 Claims, 4 Drawing Figures

METHOD AND APPARATUS FOR OVERCOMING CERTAIN DESTABILIZING TORQUES ON GYRO-STABILIZED PLATFORMS

BACKGROUND OF THE INVENTION

The present invention relates generally to gyro-stabilized apparatus of the type employed, for example, on moving vehicles for providing a stabilized mounting platform for antennas, guns, optical devices, and the like, and more particularly to a method and an apparatus for overcoming certain destabilizing torques that may be applied to the platform.

In the prior art, one or more gyroscopes may be employed to provide stabilization (more particularly, short-term stabilization) of a platform, for example, about one or more rotational axes, such as pitch and roll axes. Usually, gyroscopic stabilization is employed in conjunction with some form of long-term "centralizing means" that provides steady-state or average direction or reference orientation of the platform. This centralizing means may provide a local vertical or horizontal reference, and may employ, for example, pendulums, springs, springs and mechanical linkages, or electrical torquers referenced to an external sensor.

Prior art stabilized platforms (that term being used herein to connote any stabilized structure or device) having one or more gyroscopes for stabilization of the platform about one or more axes are subject to destabilizing torques under certain conditions. For example, a typical ship-board platform stabilized about pitch and roll axes by platform-supported gyros may become destabilized when one of the gyros has its spin axis in a non-vertical orientation and the platform experiences angular motion in yaw (i.e., a change in azimuth relative to the meridian).

A closed-loop servo mechanism for slaving the platform to the ship's gyrocompass can provide a high degree of stabilization relative to the meridian. However, two stabilization problems may exist which are not completely resolved by this technique: namely, (1) destabilization due to uncompensated yaw in rapid or severe yaw motion, and (2) destabilization due to a cable "upwrap" maneuver that must be performed from time-to-time. The latter problem stems from the use of electrical cables connected to an apparatus on the platform from external equipment. Such cables acquire a cumulative twist due to relative azimuth motion between the ship and the platform over long periods of time and must be untwisted in a cable "unwrap" maneuver that involves rotating the platform by 180° or 360° in azimuth about its normally vertical axis.

SUMMARY OF THE INVENTION

The invention provides a method of and an apparatus for preventing destabilization of a gyro-stabilized apparatus of the type that includes a platform having a pair of gyros supported thereon for movement about parallel precessional axes, and wherein the platform is capable of movement about a platform axis and the gyros have rotors with means for driving the rotors clockwise and counterclockwise, respectively, about spin axes that are normally parallel to the platform axis. In accordance with the invention, destabilization is prevented by caging, when the platform is moved about its platform axis, the gyro of the pair whose rotor is spinning in a direction opposite to the direction of movement of the platform.

BRIEF DESCRIPTION OF THE DRAWINGS

FIG. 3 is a vertical sectional view taken approximately along the line 3—3 of FIG. 2; and FIG. 4 is a fragmentary perspective view illustrating a portion of a gyro assembly and a caging lever.

DESCRIPTION OF THE PREFERRED EMBODIMENT

The invention may be employed for gyro-stabilization of a wide variety of devices such as antennas, guns, optical devices, and the like particularly on moving vehicles, and for illustrative purposes will be described in connection with stabilization of a ship-board platform for a satellite antenna.

Figure 1:
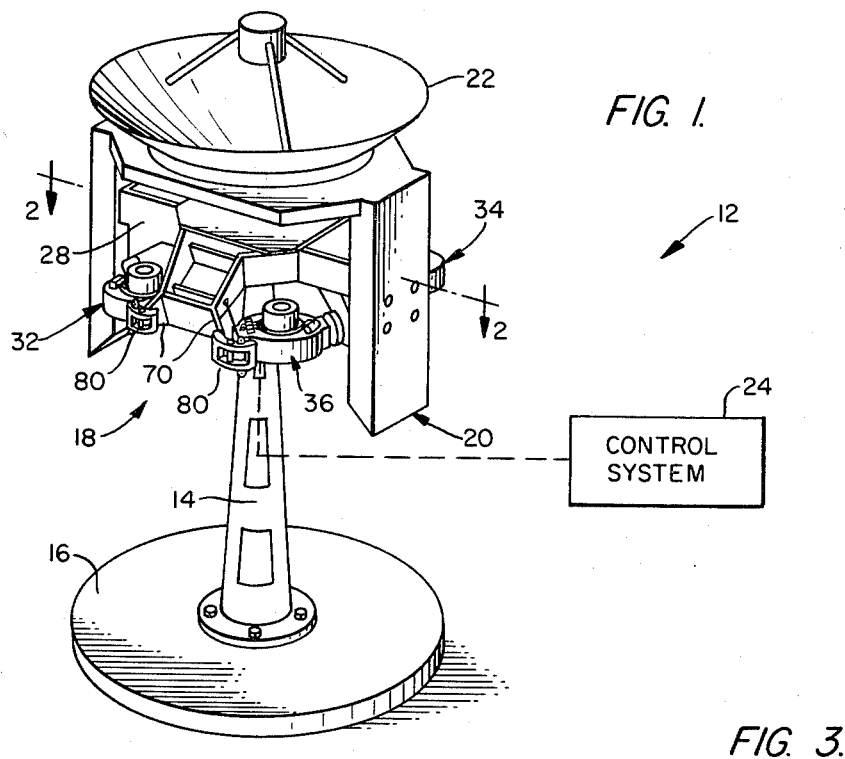
FIG. 1 is a perspective view of a gyro-stabilized apparatus in accordance with the invention.

FIG. 1 illustrates a stabilized ship-board antenna system 12 embodying the invention. As shown, the antenna system may generally comprise a support structure 14, such as a post, mounted on a base 16, which may be supported on the deck or superstructure of a ship, a stabilized azimuth assembly 18 rotatably supported on support structure 14, an elevation assembly 20 pivotally mounted on the azimuth assembly, a satellite antenna 22 mounted on the elevation assembly, and a control system 24, preferably employing a computer, for controlling the antenna system. As will be explained hereinafter, azimuth assembly 18 may be pivotally supported on a gimbal assembly (not illustrated in FIG. 1) having orthogonal gimbal axes aligned with orthogonal reference axes, such as of the ship's gyrocompass, which are parallel to the roll and pitch axes of the ship. The azimuth assembly may be arranged for rotation in azimuth, i.e., in a substantially horizontal plane about a substantially vertical axis, and may be slaved to the ship's gyrocompass for long-term stabilization with respect to a meridian. As will also be described shortly, the azimuth assembly includes gyros for providing short-term stabilization of the azimuth assembly with respect to the gimbal axes, so that its orientation in inertial space remains fixed as the ship rolls and pitches beneath it. Elevation assembly 20 may be pivotally mounted on the azimuth assembly for rotation about a substantially horizontal axis through the azimuth assembly. As is apparent, antenna 22 may be pointed in any desired location by a combined movement of the azimuth assembly and the elevation assembly. The stabilized azimuth assembly enables the antenna to be held fixed in inertial space regardless of the ship's motion.

Figure 2:
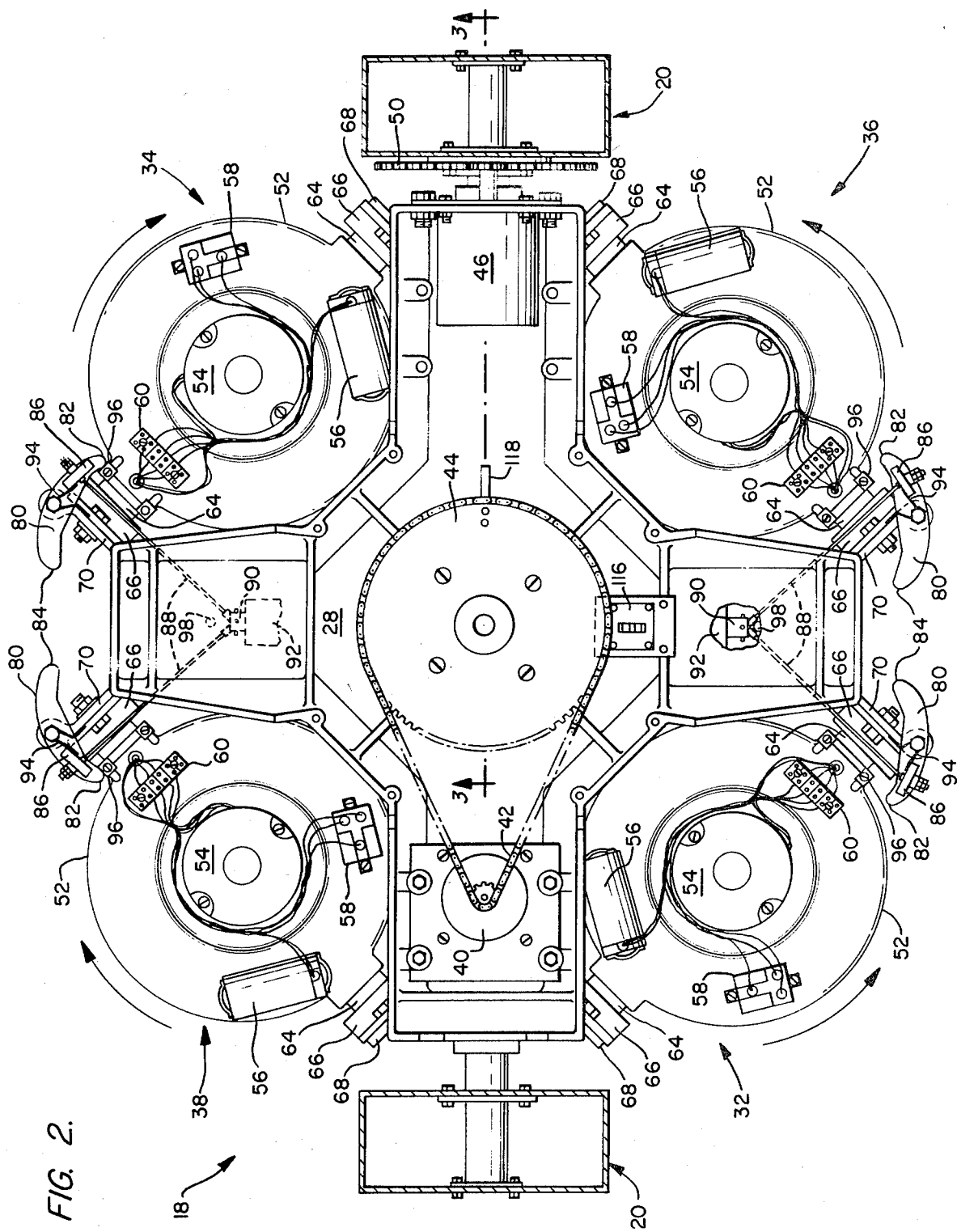
FIG. 2 is a transverse sectional view taken approximately along the line 2—2 of FIG. 1 illustrating a top view of an azimuth assembly of the stabilized apparatus.

Azimuth assembly 18 is illustrated in more detail in FIGS. 2 and 3. As shown, the azimuth assembly may comprise an azimuth platform 28, which may be a casting of an aluminum/magnesium alloy or the like, having generally the shape of a cross (as viewed from the top). As will be described more fully hereinafter, the azimuth platform is rotatably supported on support structure 14 for azimuth motion relative to the ship and is pivotally supported on support structure 14 for pitch and roll movement relative to the ship. For the latter purpose, a gimbal assembly 30 (FIG. 3) may be employed having first and second orthogonal gimbal axes that may be aligned with the roll and pitch axes of the ship. Four gyro assemblies 32, 34, 36 and 38 may be pivotally mounted on the azimuth platform for stabilizing the azimuth platform about orthogonal horizontal axes. The azimuth platform may support an azimuth drive motor 40 connected by a drive chain 42 to a stationary azimuth gear 44, which is mounted on the gimbal assembly, for rotating the azimuth platform with respect to the gimbal assembly, and may support an elevation drive motor 46 connected by a drive chain 48 to an elevation gear 50 mounted on the elevation assembly (see FIG. 3) for rotating the elevation assembly with respect to the azimuth platform.

As shown in FIGS. 1, 2 and 4, each gyro assembly may comprise a housing 52, enclosing a rotor (not shown) and having a motor 54 mounted therein for rotating the rotor about a nominally vertical spin axis. A motor starting capacitor 56, a starting relay 58, and an electrical terminal strip 60 providing an interconnection point for electrical conductors may also be mounted on the gyro assembly housing. Electric cables (indicated by the dotted line in FIG. 1) that extend from control system 24 through the center of support structure 14 and through the center of gimbal assembly 30 to the azimuth platform may supply power to each motor. The cables, which may also include cables supplying power to other components on the azimuth platform and RF cables that are connected to the antenna, are the cables that become wrapped when the azimuth platform rotates with respect to the ship, as previously described. Each gyro assembly is pivotally supported on the azimuth platform for movement about a precession axis. For this purpose, each housing 52 may be formed with diametrically opposed trunnions 64 received in bearing assemblies 66 which are connected to depending brackets or platform extensions 68, 70 that project from the azimuth platform adjacent to the ends of the platform arms. In the preferred embodiment the platform and the gyro assemblies themselves are pendulous.

As shown in FIG. 2, the precession (pivotal) axes of gyro assemblies 32 and 34 are parallel, and the precession axes of gyro assemblies 36 and 38 are parallel and perpendicular to the precession axes of gyro assemblies 32 and 34. Gyro assemblies 32 and 34, and gyro assemblies 36 and 38, constitute first and second pairs of gyros, respectively, for stabilizing the azimuth platform with respect to the reference axes. Gyro assemblies 32 and 34 are driven such that their rotors spin in opposite directions (for example the directions indicated by the arrows in FIG. 2). Similarly, gyro assemblies 36 and 38 are driven such that their rotors spin in opposite directions as shown. In the preferred embodiment, the spin directions of gyro assemblies 32 and 36, and the spin directions of gyro assemblies 34 and 38, are the same, for reasons which will be apparent shortly.

As is well known, when external torques are applied to the azimuth platform as a result of the ship's rolling and pitching motions, the gyro assemblies precess about their precession axes to absorb the torques in order to maintain the azimuth platform in a substantially horizontal plane. The ship's gyrocompass may be used as a long-term azimuth reference for the platform, and the azimuth drive motor may be slaved to the gyrocompass by a servo system (not shown) so that, in general, the orientation of the platform with respect to a meridian remains fixed as the ship yaws. Accordingly, azimuth platform 28 (and antenna 22) is stabilized so that its orientation in inertial space remains fixed as the ship rolls, pitches and yaws.

However, the servo system may be unable to compensate fully for the yawing motion of the ship, resulting in a rotational motion of the azimuth platform with respect to a meridian. Also, during a cable unwrap maneuver, it is necessary to rotate the azimuth platform intentionally with respect to the meridian.

It has been found that destabilization of the platform can occur when a pitch or roll disturbance of the platform takes place simultaneously with azimuth motion of the platform with respect to a meridian. When a pitch or roll disturbance of the platform occurs, the spin axis of a gyro may be deflected from its normal vertical orientation in order to absorb the effect of a disturbing torque. If at this time an azimuth movement of the platform occurs, there is a tendency for interaction between the azimuth movement of the horizontal component of the momentum of the deflected gyro. This interaction may cause the gyro to precess in a direction that causes its spin axis to return to vertical (if the gyro rotor is spinning in the same direction as the azimuth motion) or it may cause the gyro to precess in the opposite direction toward its stops (if its rotor is spinning in a direction opposite to the azimuth motion). If the gyro precesses towards its stops, and particularly if it hits its stops, the platform may tilt or become completely destabilized. In accordance with the invention, azimuth assembly 18 includes means for overcoming such destabilizing torques, as will now be described.

As shown in FIGS. 1, 2 and 4, a caging lever 80 is provided for each gyro assembly. A caging lever may be pivotally mounted on each platform extension 70 for rotation about a pivotal mounting axis that is parallel to the rotational axis of the platform. Each caging lever may be a casting, having the shape best illustrated in FIG. 4, formed with an engaging portion 82 which extends parallel to its pivotal mounting axis, a counterbalancing portion 84 disposed on the side of the pivotal mounting axis opposite to the engaging portion, and a pair of tabs 86 adjacent to the engaging portion. One tab may be employed for connecting the caging lever to an operating rod or cable 88. The operating rods are arranged in pairs and each pair is connected to the movable member 90 of a corresponding operating solenoid 92 mounted on the azimuth platform. As shown in FIG. 4, the caging lever is preferably symmetrical about a transverse plane (horizontal in the figure) so that the same casting may be employed for all caging levers. (It will noted that the tab 86 that is used depends on whether the caging lever is used as "left-hand" or "right-hand" lever.) As shown in FIG. 2, a spring 94, engaging a tab 86 and a platform extension 70, may be employed for biasiing each caging lever to a non-caging position (the positions of the caging levers at the bottom of FIG. 2 associated with gyro assemblies 32 and 36).

When either solenoid 92 is operated, its caging levers are pivoted to a caging position (the position of the two caging levers at the top of FIG. 2 associated with gyro assemblies 34 and 38), at which the engaging portion 82 of the caging lever engages a surface 96 (see FIG. 4) of the gyro assembly housing that is parallel to the spin axis of the gyro assembly. This pivots the gyro assembly about its precession axis and forces the spin axis of the gyro assembly to become parallel with the rotational axis of the platform. When the solenoids are de-energized, springs 94 pivot the caging levers to their non-caging positions. Stops 98, which may comprise pins depending from the azimuth platform, limit the outward movements of movable members 90 of the solenoids and establish the non-caging positions of the caging levers. In the non-caging positions, engaging portions 82 of the caging levers serve as precession limits (stops) for the gyro assemblies.

The two solenoids 92 are independently operable, and, as shown in FIG. 2, each solenoid is operable to cage two gyro assemblies that have the same rotor spin direction, i.e., gyro assemblies 32 and 36 are caged by operation of the solenoid 92 illustrated within the broken-away portion at the bottom of FIG. 2, and gyro assemblies 34 and 38 are caged by operation of the solenoid shown in dotted lines at the top of FIG. 2. Furthermore, the gyro assemblies that are caged by a particular solenoid are elements of both pairs of gyro assemblies, i.e., gyro assemblies that stabilize the platform with respect to both reference axes.

As described above, destabilization of the platform can occur during azimuth motion of the plaform when gyro assemblies that have a spin direction opposite to the direction of azimuth motion of the platform have spin axes that are not parallel to the rotational axis of the platform (vertical in the embodiment shown). The invention avoids such destabilization by caging the gyro assembly of each pair that has a spin direction opposite to the direction of azimuth rotation of the platform. Caging forces the spin axes of the caged gyro assemblies to become parallel with the rotational axis of the platform. The other two, uncaged, gyro assemblies remain free to absorb disturbing torques on the platform, and to stabilize the platform with respect to the reference axes. The rotation of the platform in azimuth interacts with the uncaged gyros and tends to precess them toward a more vertical (stable) orientation.

The operation of solenoids 92 may be controlled by control system 24. Since the direction of rotation of the azimuth platform relative to a meridian is known for a cable unwrap maneuver and in any case can be readily determined, it is a simple matter to determine which solenoid should be operated to cage the appropriate gyro assemblies.

Although not necessary to an understanding of the invention, further details of the preferred embodiment may be of interest to those skilled in the art and will now be described briefly. Further details are also described in the copending application of Edmund S. Zavada and Laurence J. Mayer (U.S. application Ser. No. 06/319621) for an Improved Gyro-Stabilized Apparatus, filed concurrently herewith and incorporated by reference herein.

The gimbal assemby 30 enables the azimuth assembly 18 to pivot about roll and pitch axes with respect to support structure 14. As shown in FIG. 3, the gimbal assembly may comprise an upper yoke 100 and a lower yoke 102 pivotally connected to a gimbal ring 104 for rotation about orthogonal gimbal axes which may be parallel with the roll and pitch axes of the ship. The azimuth platform may be formed with a depending circular projection 126 (see FIG. 3) adapted to abut a rubber bumper 128 on the top of the support structure to limit the pivotal movement of the azimuth platform with respect to the support structure. As shown, the lower yoke may be attached to support structure 14, and the azimuth platform may be rotatably supported about a central hub 106 thereof on the upper yoke by bearings 108. A grease seal 110 may be employed for sealing a bearing lubricant within central hub 106. A gear spacer 112 may be threaded onto the top of the upper yoke 100, as shown, and the stationary azimuth gear 44 may be attached thereto. A mechanical azimuth stop 114 may also be included for limiting the rotation of the azimuth platform with respect to the support structure to a predetermined number of degrees.

To determine the orientation of the azimuth assembly with respect to support structure 14, a sensing device 116, such as an optical sensor, may be positioned on azimuth platform 28 (see FIGS. 2 and 3) and a marker 118 may be attached to azimuth gear 44 and formed so that when the azimuth platform is rotated to a predetermined orientation with respect to support structure, the marker is aligned with the sensor to provide an output signal. As shown in FIG. 3, a similar sensor 120 attached to the azimuth platform and a marker 122 attached to the elevation gear 50 may be employed for establishing a reference position for elevation assembly 20 with respect to azimuth assembly 18.

Azimuth drive motor 40 and elevation drive motor 46 are preferably stepping motors, operated by control system 24, which rotate a predetermined number of degrees each time they are operated. The control system preferably includes a computer which receives the output signals from sensors 116 and 120, and keeps track of the number of times the azimuth drive motor and the elevation drive motor are operated, and their directions of rotation, so that the orientation of the azimuth platform with respect to support structure 14 and the orientation of elevation assembly with respect to the azimuth assembly can be determined. The control system may also receive information from the ship's gyrocompass s that it can determine the orientation of the azimuth assembly in inertial space.

While a preferred embodiment of the invention has been shown and described, it will be apparent to those skilled in the art that changes can be made in this embodiment without departing from the principles and spirit of the invention, the scope of which is defined in the appended claims.

What is claimed is:

1. In a gyro-stabilized apparatus of the type comprising a platform having a pair of gyros supported thereon for movement about parallel precessional axes and wherein the platform is capable of movement about a platform axis and the gyros have rotors with means for driving the rotors clockwise and counterclockwise, respectively, about spin axes that are normally parallel to the platform axis, the improvement comprising means for caging one or the other of said gyros when the platform moves about said platform axis, the gyro caged being that which has its rotor spinning in the direction opposite to the direction of movement of the platform about the platform axis.

2. The improvement of claim 1, wherein there are two pairs of such gyros supported on the platform with the precessional axes of one pair at an angle to the precessional axes of the other pair, and wherein the caging means cages one gyro of each pair.

3. The improvement of claim 2, wherein the second-mentioned precessional axes are perpendicular to the first-mentioned precessional axes.

4. The improvement of claim 2, wherein the platform axis and the spin axes are normally vertical and the pairs of gyros are effective to stabilize the platform about pitch and roll axes.

5. The improvement of claim 4, wherein the spin axis of each caged gyro is substantially vertical.

6. The method of preventing destabilization of a gyro-stabilized apparatus of the type comprising a platform having a pair of gyros supported thereon for movement about parallel precessional axes and wherein the platform is capable of movement about a platform axis and the gyros have rotors with means for driving the rotors clockwise and counterclockwise, respectively, about spin axes that are normally parallel to the platform axis, said method comprising, when the platform moves about its platform axis, caging the gyro of said pair whose rotor is spinning in a direction opposite to the direction of movement of the platform about the platform axis.

7. A method in accordance with claim 6, wherein the platform supports apparatus supplied by an electric cable that becomes wrapped as a result of movement of the platform about said platform axis and wherein the platform is caused to move about said platform axis in a direction to unwrap said cable while one of said gyros is caged.

* * * * *